Jan. 27, 1931.    A. W. NORDGREN    1,790,244
BUMPER ADAPTER FOR TRUNK PLATFORMS
Original Filed July 29, 1929
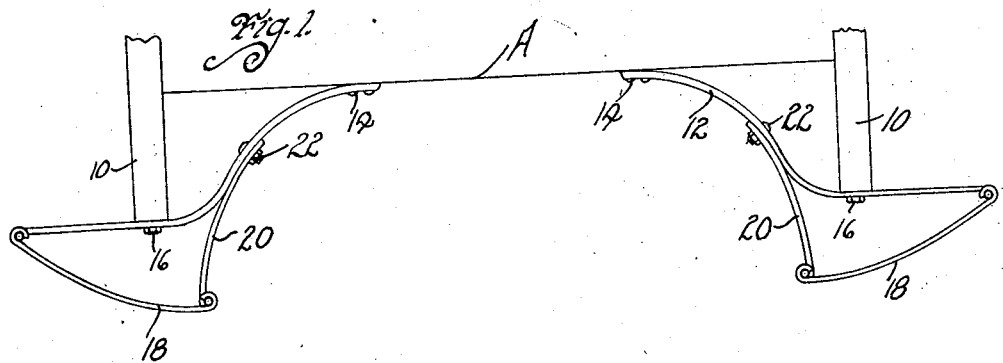
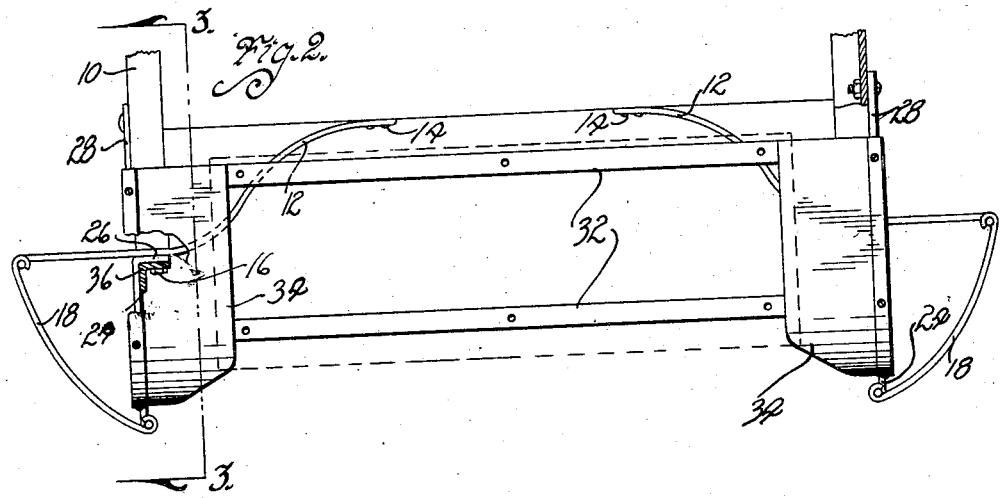
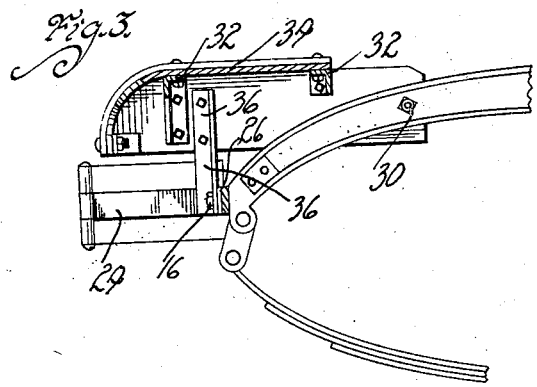
Inventor
Algot W. Nordgren
by Bair, Freeman & Sinclair
Attorneys
Witness
Edw. Seeley Patented Jan. 27, 1931

1,790,244

UNITED STATES PATENT OFFICE

ALGOT W. NORDGREN, OF ST. PAUL, MINNESOTA, ASSIGNOR TO MARQUETTE MANUFACTURING COMPANY, OF ST. PAUL, MINNESOTA

BUMPER ADAPTER FOR TRUNK PLATFORMS

Original application filed July 29, 1929, Serial No. 381,799. Divided and this application filed May 21, 1930. Serial No. 454,350.

The object of my invention is to provide a bumper adapter for trunk platforms of simple, durable and comparatively inexpensive construction.

More particularly it is my object to provide a bumper adapter whereby the standard bumper fittings of the automobile can be utilized and moved to position where a trunk platform can be supported upon the rear end of the frame of the automobile and at the same time the bumper moved to position where it will be rearwardly of the trunk platform for protecting the same.

My present invention is a division of my co-pending application filed July 29th, 1929, Serial Number 381,799.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a top plan view of the rear end of an automobile illustrating the frame thereof and the normal bumper connections thereto.

Figure 2 is a top plan view illustrating a trunk platform and the bumper adapter mounted in position on the frame of the automobile.

Figure 3 is a sectional view taken on line 3—3 of Figure 2.

In the accompanying drawings I have used the reference character A to indicate generally the rear end of an automobile and 10, the side frame elements of the automobile. Upon each of the side frames 10 is mounted a bumper support 12 having connection with the rear portion of the automobile A as at 14 and an intermediate connection as at 16. A bumper element 18 is carried by the outer end of the bumper support 12 and a brace 20. The brace 20 is connected to the support 12 between the connections 14 and 16 by means of a bolt 22. The parts shown in Figure 1 exemplify the normal position of the bumper shown at the rear of the automobile as standard equipment.

In order to mount a trunk platform on the rear end of the automobile and at the same time to position the bumper elements rearwardly of their normal position, I provide an adapter element 24. The adapter element 24 is provided with an off-set or flanged end 26 for providing an angular corner. The brace 20 is removed from the bumper element 18 and the bumper support 12 and in place thereof is used the adapter 24. The flanged end 26 of the adapter 24 is connected to the bolt 16 and thus to the frame 10.

The adapter changes the position of the bumper element 18 as disclosed in Figure 2 of the drawings. The trunk platform which I mount upon the rear end of the automobile consists of a pair of side plates 28 which are bolted to the frame 10 by means of bolts or the like 30. A pair of angle bar, crosspieces 32 are employed for connecting the side plates 28 together. Shields 34 of any suitable design are used adjacent the ends of the cross pieces 32 as shown in Figure 2 of the drawings.

In order to additionally support the trunk platform I provide angular connections 36 which are fastened to the side plates 28 and project downwardly therefrom. The angular connections 36 fit into the corner of the adapter which is formed by the off-set or flanged end 26. The connection 36 is bolted or secured to the adapter 24, and to the bumper support 12 as well as the frame 10 by means of the bolt 16. In some instances it is necessary to discard the original bolt 16 and to use one that is longer, due to the fact that the connection 36 and the adapter 24 are both connected to the bumper support by means of the bolt 16.

It will be noted that by use of the adapter 24 I am able to position the bumper element 18 rearwardly a greater distance than its normal or original position, and at the same time provide a convenient means of connection for the angular piece 36 of the trunk platform, as well as protect the trunk platform.

One of the advantages of my device resides in the fact that it can be quickly and easily adapted for use in connection with a trunk platform with a minimum amount of labor and inconvenience.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In combination with the frame of an automobile, a bumper support secured thereto at two points, a bumper adapter secured to said support at one point, a bumper element carried by the free ends of said support and said adapter and a trunk platform mounted on said frame and additionally supported by connection with the adapter and bumper support by the same fastening that connects said adapter and bumper support to the automobile frame.

2. In combination with the frame of an automobile, a bumper support secured at one end to the automobile and intermediate its ends to the automobile frame, a bumper adapter secured to said support at its intermediate fastening, a bumper element carried by the free ends of said bumper support and adapter and a trunk platform secured to the frame of the automobile and additionally supported by connections with the intermediate fastening of the bumper support.

3. In combination with the frame of an automobile, a bumper support secured at one end to the automobile and intermediate its ends to the automobile frame, a bumper adapter secured to said support at its intermediate fastening, said adapter having its end offset for providing an angular corner, a bumper element carried by the free ends of said bumper support and adapter and a trunk platform secured to the frame of the automobile and additionally supported by connection with the intermediate fastening of the bumper support and said last connection being angular and fitting into the corner of said adapter.

Des Moines, Iowa, April 21, 1930.

ALGOT W. NORDGREN.